United States Patent [19]
Hembree et al.

[11] Patent Number: 4,709,483
[45] Date of Patent: Dec. 1, 1987

[54] GLASS CUTTING DEVICE

[75] Inventors: Charles B. Hembree, El Cerrito; Brian T. Shea, Berkeley, both of Calif.

[73] Assignee: Wing Aero, El Cerrito, Calif.

[21] Appl. No.: 589,583

[22] Filed: Mar. 14, 1984

[51] Int. Cl.$^4$ ............................................. C03B 33/04
[52] U.S. Cl. ........................... 33/18.1; 33/1 M; 33/32.3; 83/71; 83/886
[58] Field of Search ............... 33/18 R, 23 C, 32 R, 33/32 B, 32 C, 1 M; 83/879, 880, 884, 886, 71

[56] References Cited

U.S. PATENT DOCUMENTS

| | | | |
|---|---|---|---|
| 3,058,220 | 10/1962 | Eary | 33/32 C |
| 3,246,550 | 4/1966 | Galey et al. | 83/71 X |
| 3,424,357 | 1/1969 | Curtze et al. | 33/32 R |
| 3,490,320 | 1/1970 | Valembois et al. | 83/71 X |
| 3,543,978 | 12/1970 | Feillet | 33/32 C X |
| 3,570,733 | 3/1971 | Allen | |
| 3,790,003 | 2/1974 | Tausheck | |
| 3,850,043 | 11/1974 | Tarbox | 33/1 M X |
| 3,881,618 | 5/1975 | Tausheck | |
| 3,895,358 | 7/1975 | Pearl | 83/71 X |
| 4,171,657 | 10/1979 | Halberschmidt et al. | |
| 4,331,050 | 5/1982 | Gergek | |
| 4,380,944 | 4/1983 | Gerber et al. | |
| 4,422,149 | 12/1983 | Reinmold et al. | |

FOREIGN PATENT DOCUMENTS 2484393 6/1980 France .
727581 2/1978 U.S.S.R. .

Primary Examiner—Harry N. Haroian
Attorney, Agent, or Firm—Bielen and Peterson

[57] ABSTRACT

A glass cutting device which is especially useful for cutting sheet glass having a motor driven glass cutting head mounted on a platform. The glass cutting head may include a marker as well as a cutting wheel for performing the functions of marking and cutting glass from a stock piece of glass. The motor driven cutting head may be controlled by a computer providing optimizing instructions to reduce waste in the cutting operation.

6 Claims, 10 Drawing Figures

Microfiche Appendix Included
(1 Microfiche, 52 Pages)

GLASS CUTTING DEVICE

A microfiche appendix is included. Comprised of 1 fiche with 52 frames.

BACKGROUND OF THE INVENTION

The present invention relates to a novel glass cutting device and method for operating a motor driven glass cutting head on a platform.

Pieces of glass or lites normally employed with windows and doors are generally cut from large plates of glass. Prior art glass cutting devices have been developed to handle these large sheets of glass. For example, U.S. Pat. Nos. 3,790,003 and 3,881,618 describe tiltable glass cutting tables which may be employed to this end. The U.S. Pat. No. 3,570,733 describes a glass cutting table which employs air jets to permit the glass sheet to move easily on the top of the table.

In this regard, U.S. Pat. No. 4,171,657 describes a cutting machine which employs a cutting head movable in the X and Y directions. Drive motors fixed to a frame utilize belts which move the cutting head along predetermined paths. Also, this prior art device employs a numerical control signal to direct the cutting head in its cutting mode.

U.S. Pat. Nos. 4,331,050 and 4,380,944 describe cutting devices which employ digital computers to cut a particular material along a predetermined path. Russian Patent 727,581 discloses a moving sheet transverse cutting control apparatus which also includes a program for marking off and cutting the material. U.S. Pat. No. 4,422,149 and French Patent 2,484,393 describe cutting mechanisms which move along predetermined paths and generally have feedback systems to monitor the travel of the cutting head along the surface being cut.

Despite the advances in the prior art devices, a large amount of waste occurs in cutting glass sheets since efficient cutting of a multiplicity of lites from stock sheets of glass involves a great deal of calculating and planning. Moreover, it has been found that it is difficult to keep track of the lites which have been produced and the waste pieces which are a by-product of the cutting operations of the prior art. For example, waste pieces are often reuseable to produce desired lites but are often discarded because of the difficulty in retrieving and measuring of the same for reuse. Further, waste pieces are of a variety of sizes making categorization of the same difficult. At best, lites and waste pieces have been marked by hand after cutting which is a time consuming process.

SUMMARY OF THE INVENTION

In accordance with the present invention, a novel and useful X - Y cutting device, which especially useful for cutting glass which automatically optimizes the cutting sequence, is provided.

The glass cutting device of the present invention includes a carriage including a cutting tool which is mounted on a carriage movable across a sheet of glass to be cut. A marker is supported to the carriage and is used for applying indicia to selected portions of the glass sheet. Means is also included for controllably moving the cutting head across the glass sheet to effect cutting of the glass sheet and to effect marking portions of said glass sheet. The marker may be raised and lowered in relation to the glass sheet at selected times during the cutting process. Likewise, the cutting tool may be raised and lowered from the glass sheet, especially during the time sequence required for marking the glass sheet. Thus, the glass sheet may be cut and marked sequentially.

The present invention may also be deemed to include a method of operating a motor driven glass cutting head mounted on a glass cutting platform with the aid of a computer. The method would include the steps of providing the computer with a data base for the motor driven glass cutting head. The data base might include a list of dimensions of desired cut pieces of glass or lites (cut list), a list of dimensions of pieces of glass in stock (stock list), and in certain cases a list of dimensions of desired waste pieces of glass (cut-off list). The computer would repetitively compare the dimensions of a certain lite from the cut list to the dimensions of the pieces of glass on the stock list. Preferably, the largest lite would be compared to the stock list in order of smallest to largest. Determination is then made which stock piece should be used and if any remainder pieces of glass will result from this determination. The computer also decides the orientation and the cutting start and end points for the particular pattern of the lite from the cut list. This determination would produce a remainder piece of glass having a maximum area. At this point, any remainder pieces of glass are added to the stock list and sorted from smallest to largest in order to maximize the use of the glass available to meet the demands of the cut list. The above procedure is repeated in the computer for each lite on the cut list until a sequence of cutting events are determined. The operator would position the stock pieces designated for each cutting sequence and the computer would signal the motor driven cutting head to automatically effect the cuts.

In addition, where a list of dimensions of desired waste pieces of glass has been provided to the computer, before any cuts are performed, the computer would also determine where to fit glass pieces from the cutoff list onto the portions of the stock pieces of glass which are not being used to produce lites on the cut list. As was the case with the cut list, each piece of glass on the cut-off list is also determined as to orientation and the cutting start and end points. Further, the computer signals the automatic cutting head to make such cuts.

The method of the present invention may also be defined to include the steps of marking the pieces on the cut list and the cut-off list at some point during the cutting process. It has been found, that such marking should take place immediately before cutting of the pieces of glass from both lists.

It may be apparent that a novel and useful glass cutting device and method for cutting glass has been described.

It is therefore an object of the present invention to provide a glass cutting device which utilizes a cutting head movable in the X - Y direction on a table or platform which employs a dedicated computer permanently attached to the table programmed for both optimization of cutting and motor control.

It is another object of the present invention to provide a glass cutting device and method for cutting glass which provides for automatic labeling of each desired piece of glass and each desired waste piece of glass.

It is yet another object of the present invention to provide a glass cutting device and method for cutting glass which provides for the automatic trimming of remainder pieces into waste pieces of predetermined size and pattern.

Another object of the present invention is to provide a glass cutting device and method for cutting glass which utilizes a menu driven program having a display of the same immediately above the menu response keys on a keyboard.

Yet another object of the present invention is to provide a glass cutting machine and a method for cutting glass which achieves these goals to a higher degree of accuracy than most of the prior art devices.

A further object of the present invention is to provide a glass cutting device and a method for cutting glass which is relatively simple and inexpensive to operate and perform.

The invention possesses other objects and advantages especially as concerns particular characteristics and features thereof which will become apparent as the specification continues.

For a better understanding of the invention reference is made to the following detailed description on the preferred embodiments of the invention which should be taken in conjunction with the hereinabove described drawings.

DESCRIPTION OF THE PREFERRED EMBODIMENTS

Various aspects of the present invention will evolve from the following description of the preferred embodiments which should be referenced to the hereinabove described drawings.

Figure 1:
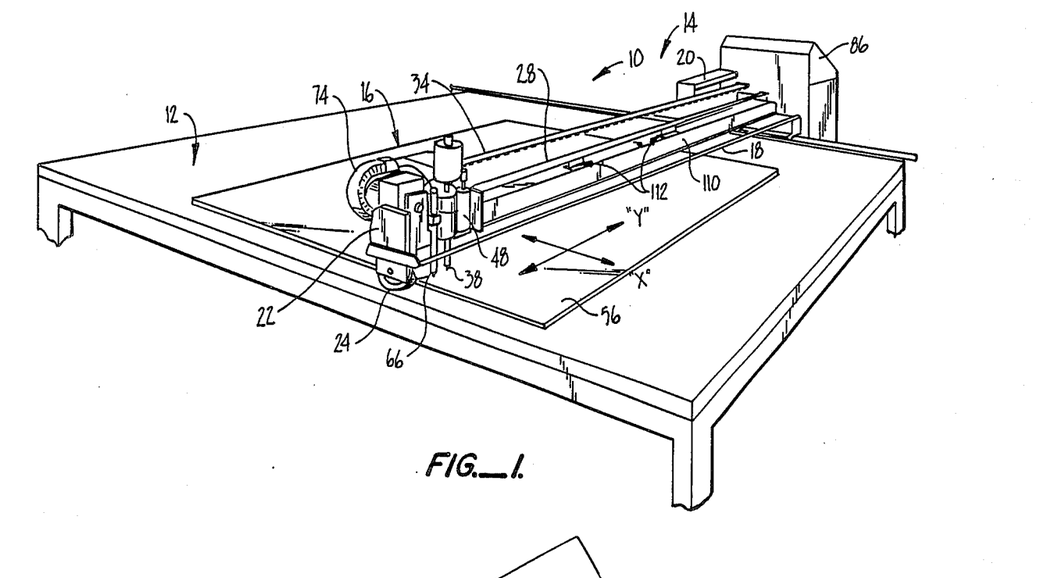
FIG. 1 is a top right side perspective view of the cutting platform and cutting head of the present invention.

The invention as a whole is represented by character 10, FIG. 1. A platform or table 12 is shown in FIG. 1 and is generally known in the prior art. Bridge 14 extends across the table and includes a cutting head 16 which moves along the bridge in the "Y" direction. The bridge 14 itself moves along the "X" direction, which will discussed hereinafter. Bridge 14 includes a stiffening rod 18 and a structural member 20 which generally extends across table 12. An end piece 22 supports wheel 24 which supports one end of bridge 14 and permits the same to move in the X direction.

Figure 2:
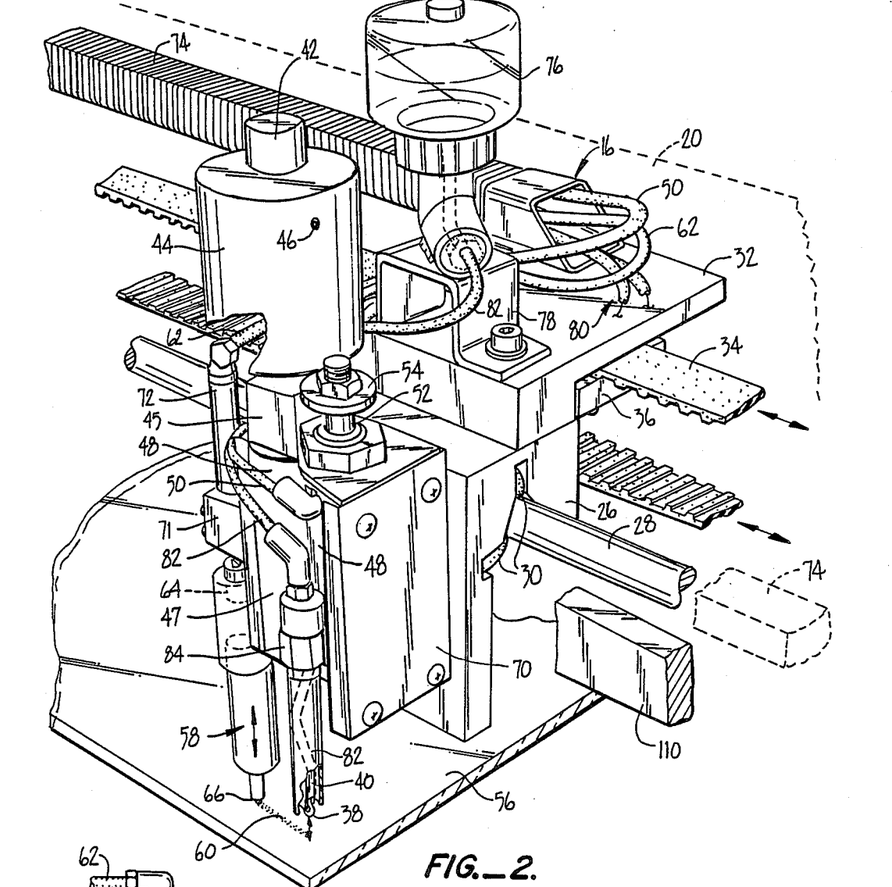
FIG. 2 is a top right broken perspective view of the cutting head of the present invention in conjunction with portions of the drive means.

Turning to FIG. 2, it may be seen that cutting head 16 includes a yoke 26 which rides along shaft 28 by the use of ball bearings 30 (shown partially in FIG. 2). Affixed to yoke 26 is a bracket 32 which is held to timing belt 34 by the use of clamping member 36. Thus, cutting head 16 moves with timing belt 34 which is usually tensioned to eliminate slack. A cutting wheel 38 connects to a shaft 40 which is mechanically linked to boss 42. A cylindrical weight 44 affixes to boss 42 via set screw 46 to exert downward force on cutting wheel 38. Consequently, cutting wheel 38 is normally in the down or cutting position. Bearing 45 supports boss 42 and bracket 47 connects the cutting wheel assembly to yoke 26. An air cylinder 48 is fed by air line 50 and forces shaft 52 upwardly. A flange 54 fixed to the upper portion of shaft 52 contacts the underside of cylindrical weight 44 and forces the same upwardly. Thus, cutting wheel 38 would be lifted from the surface of glass piece 56.

Figure 3:
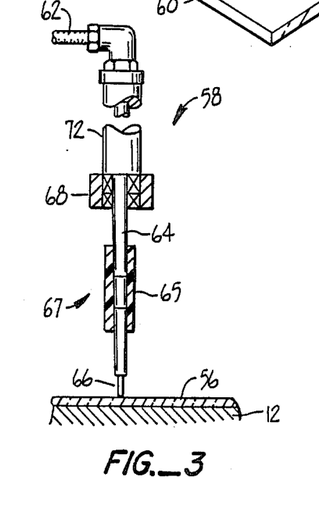
FIG. 3 is a sectional view of the marking portion of the cutting head of the present invention.
Figure 3A:
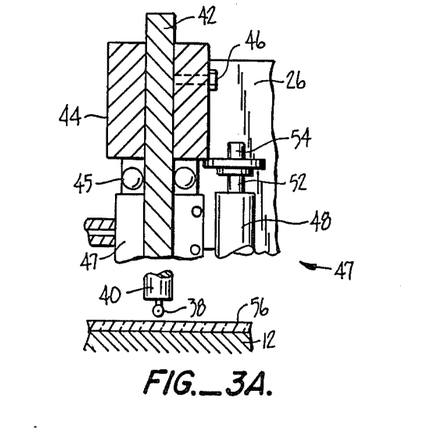
FIG. 3A is a sectional view of the cutting portion of the cutting head.

The cutting device 10 also includes means 58 for marking indicia 60 on the surface of glass piece 56 according to a known four stroke system. Turning to FIG. 3, it may be seen that marking means 58 includes an air cylinder 72 which receives air through air line 62. A shaft, FIGS. 2,3 & 4 passes through a bearing block 68 and extends downwardly. A sheath 65 holds a marking pen 66 which has a tip that is able to mark indicia 60 according to a conventional four stroke code. Sheath 65 also surroundingly engages the end of shaft 64. Air cylinders 48 and 72 may be of the type Model F-1 ⅛ X2-C, manufactured by Flairline of Livonia, Mich. Thus means 57 is provided for raising and lowering cutting wheel 38 from the surface of glass piece 56, FIG. 2A. Also, means 67 is defined for raising and lowering marker 66, FIG. 2.

Bearing block 71 fastens to bracket 47 which in turn connects to structural member 70. Thus, the entire assembly of the cutting mechanism and marking means 58 affixes to yoke 26. An oil dispenser 76 may also be employed to provide oil through oil tube 82 to cutting wheel 38. Oil tube 82 is shown partially in phantom on FIG. 3 for the sake of clarity. Cutting oil dispenser 76 may be of the type Model No. 1733-3, manufactured by Oil Write Corp. of Manitowic, Wis. Since oil dispenser 76 includes a solenoid, electrical conduits 80 are also provided to cutting head 16. A strap 78 permits oil dispenser 76 to be fastened to the top portion of bracket 32. Flexible conduit 74, known in the art, provides an enclosure for air lines 50 and 62 as well as electrical conduits 80. Flexible conduit 74 assumes a C-shape, FIG. 1, and unfurls as cutting head 16 moves across table 12 in the Y direction. Thus, it may be apparent that flexible conduit 74 and the utility conduits therein originate with console 86.

Figure 4:
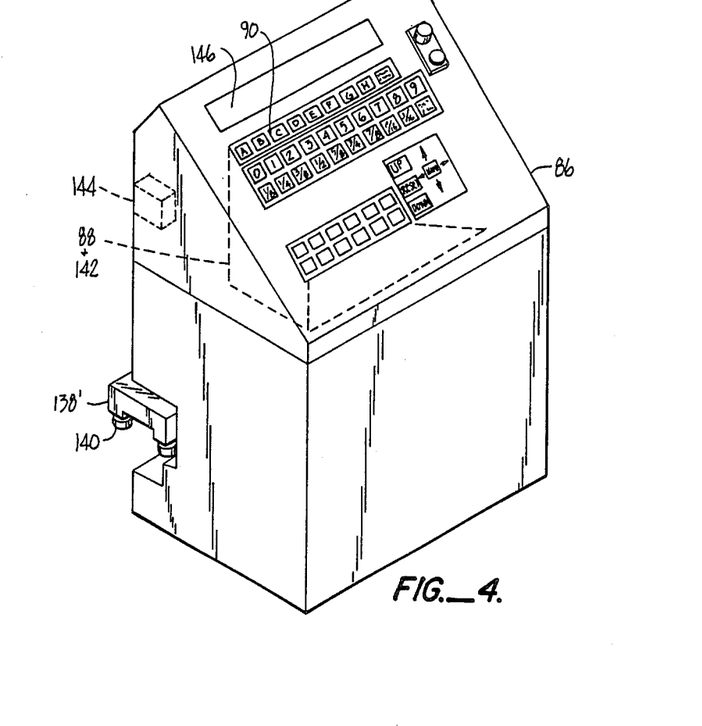
FIG. 4 is a top rear perspective view showing the console of the present invention with a keyboard on one surface thereof and the computer and translatry schematically.
Figure 4A:
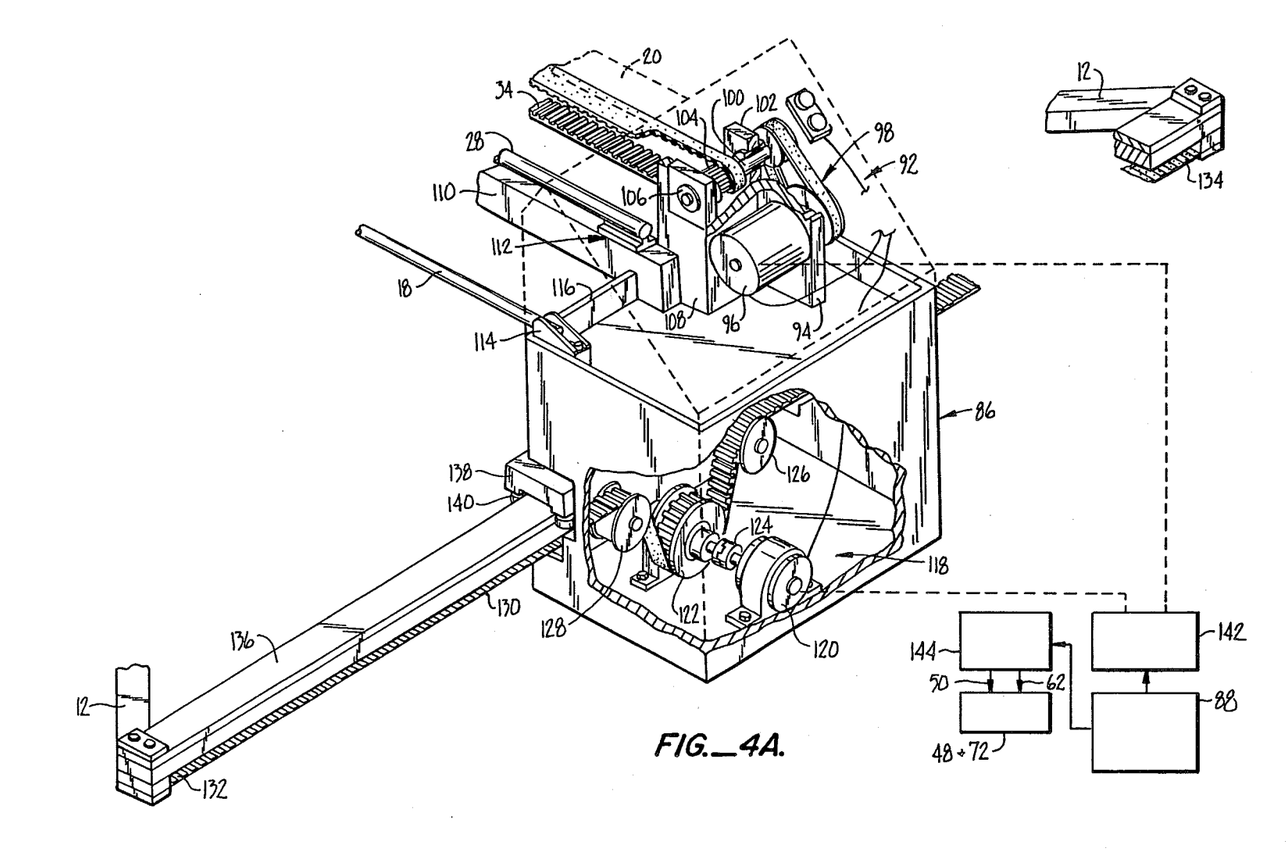
FIG. 4A is top broken perspective view showing the console and driving motors mounted therein, the cutting head and portions of the bridge, and a schematic representation of the computer, stepping motor translators and air flow control mechanism.

Turning to FIGS. 4 and 4A, it may be seen that console 86 includes a computer 88 having keyboard 90 visible to the operator of device 10. Computer 88 may be of the type Model Quark/100, Single Board, manufactured by Megatell Computer Corp., Weston, Ontario, Canada. Focussing on FIG. 4, it is illustrated that console 86 also houses Y direction motor means 92. A partition 94 holds stepping motor 96 to console 86. Pulley and belt mechanism 98 transfer the rotational motor imparted by motor 96 to shaft 100 held by bearing 102. A cog wheel 104 engages timing belt 34 which in turn moves cutting head 96 in the Y direction. Bearing 106 holds the other end of shaft 100 in position. Support 108 is likewise fixed to console 86, as is the case for partition 94. Shaft 28 affixes to bar 110 which in turn extends across table 12. Bar 110 includes a multiplicity of supports 112, FIG. 1, at periodic points across table 12. The end of bar 110 also affixes to console 86 and to support 108. U-shaped channel 114 and leg 116 connected to support 108 provide an anchor for stiffening rod 18. Channel 114 is fixed to console 86 in this regard.

Turning to the lower portion of console 86 on FIG. 4, it may be observed that extra action motor means 118 is also housed therein. Motor means 118 includes a stepping motor 120 which is coupled to cog wheel 122 via coupling 124. Pulleys 126 and 128, in combination with cog wheel 122 serve as contact points for timing belt 130. It should be added, that timing belt 130 is of the same type as timing belt 34 hereinbefore described. End portions 132 and 134 of timing belt 130 are firmly held to the ends of support track 136. Trolley 138 having wheels 140 is affixed to console 86 by any known means. Track 136 is affixed to table 12 at end portions 132 and 134 of timing belt 130. Stepping motors 96 and 120 may be of the type Model M112 FJ326, manufactured by the Superior Electric Co. of Bristol, Conn. As shown on FIG. 4 schematically, computer 88 feeds the appropriate signals to stepping motor translator 142. Translator 142 may be of the type Model No. TBM105-1218, manufactured by the Superior Electric Co. of Bristol, Conn. In addition, translator 142 feeds the appropriate signals to air flow control 144 of the type Model No. RFC1/8, manufactured by Flairline of Lavonia, Mich. As previously described, air lines 50 and 62 would feed air to air cylinders 48 and 72 to control the vertical position of cutting wheel 38 and marking means 58, respectively. The stepping motor translator 42 would be located with computer 88 in console 86.

Figure 6A:
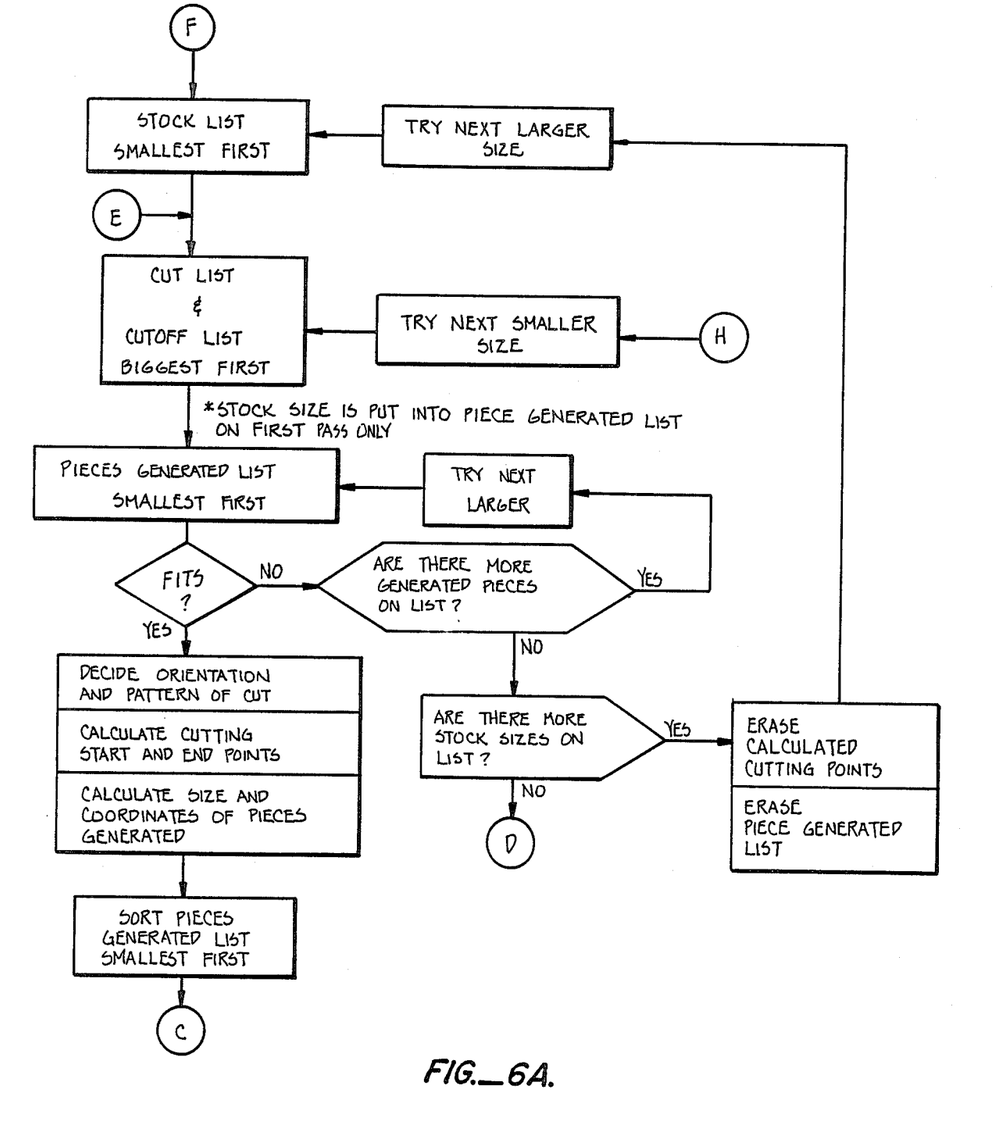
FIGS. 6A, 6B and 6C are block diagrams representing the decisional flow chart for the software associated with the present invention.
Figure 6B:
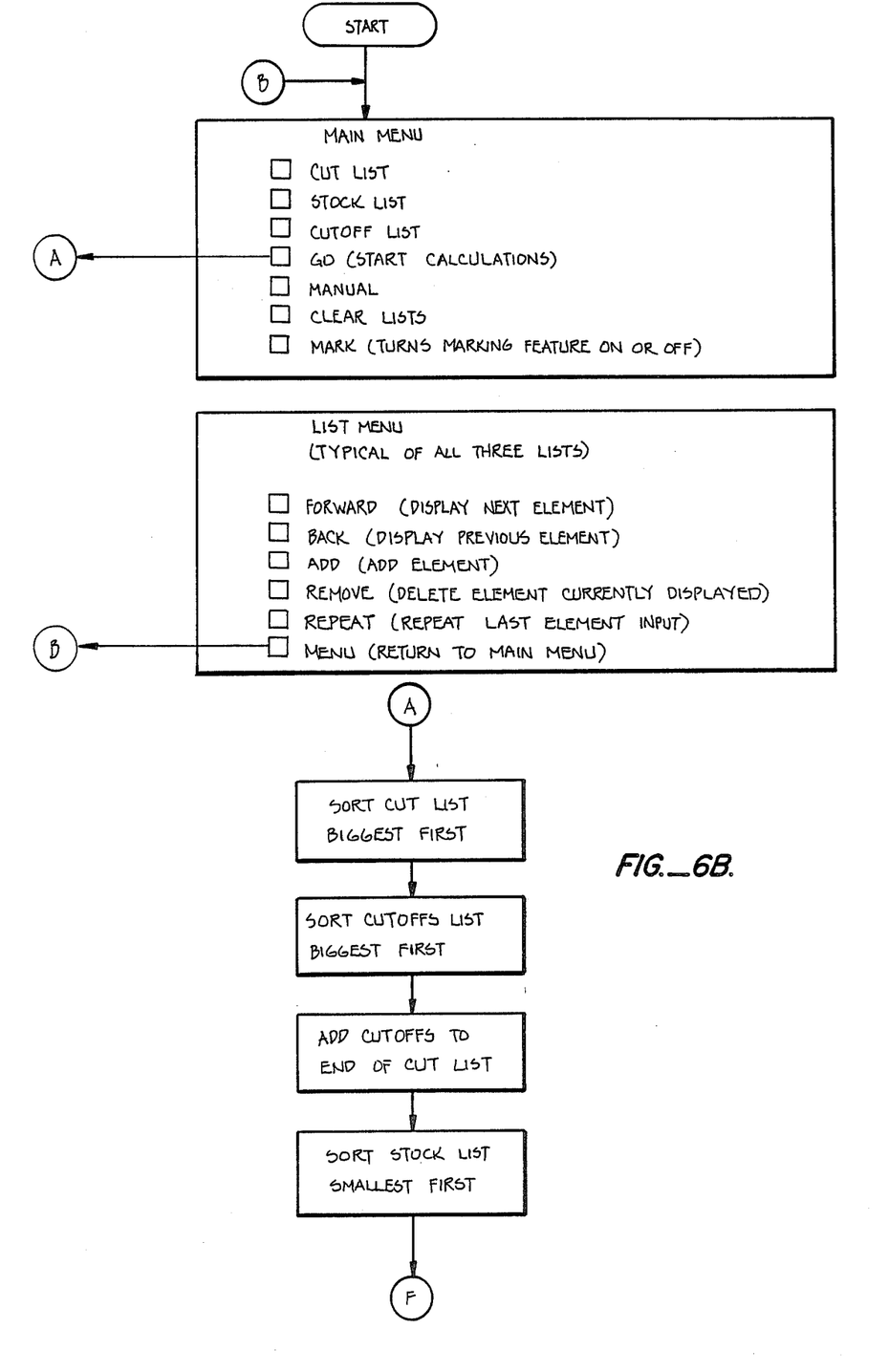
Figure 6C:
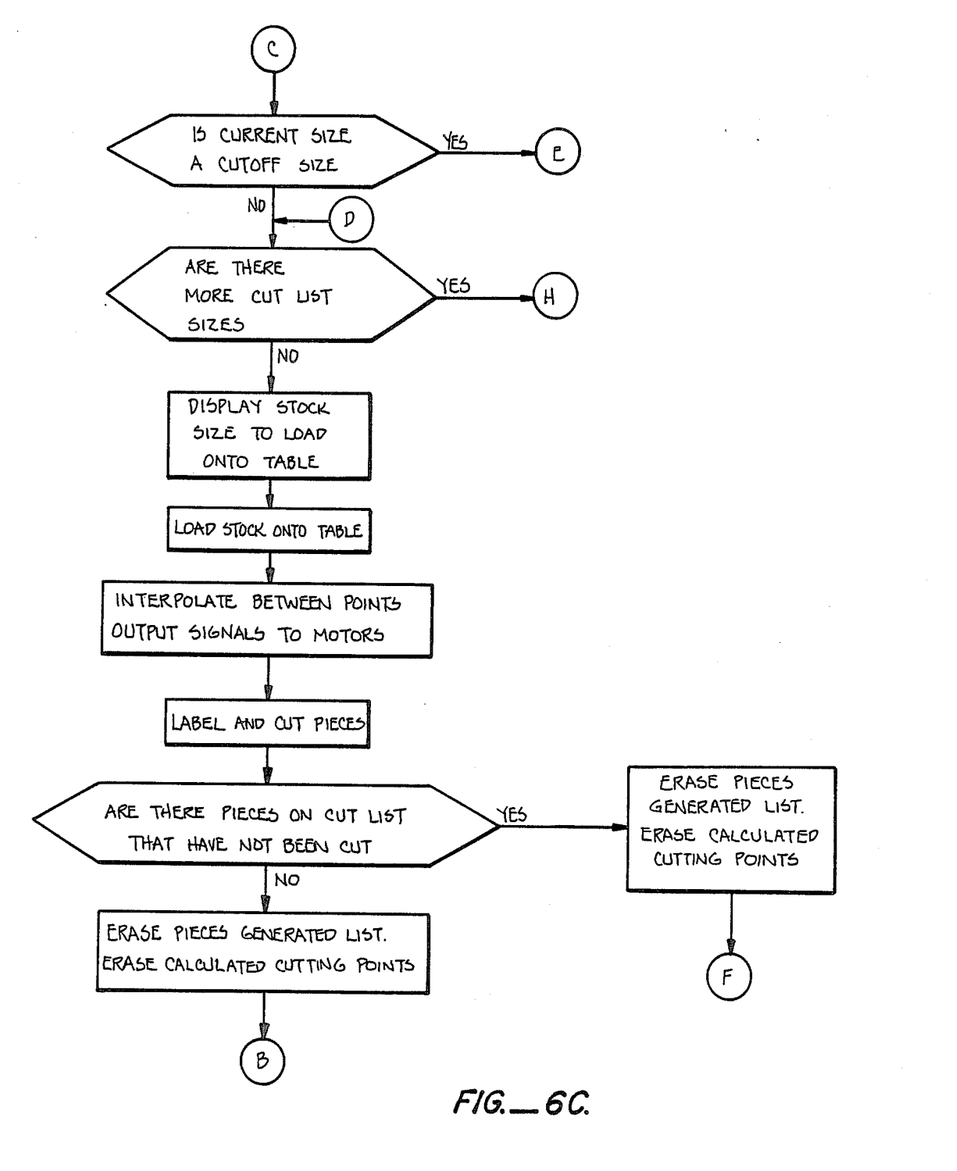

Computer 88 is programmed to control the movement of cutting head 16 in relation to stock pieces of glass, such as glass piece 56 which are placed on table 12. Computer 88 optimizes the cutting of glass from stock pieces to greatly reduced waste in cutting. In addition, waste pieces may be trimmed down to desired sizes. All cut pieces of glass are identified and marked automatically by device 10. FIGS. 6A, 6B and 6C describe decisional flow charts associated with the software for operating computer 88. The object code of the software used with device 10 is enclosed herewith as an appendix to this application.

In general, the operator of device 10 imputs three lists of sizes of glass pieces as follows:

The sizes of glass desired (cut list);

The sizes of pieces of glass that are stocked (stock list);

and, the sizes of glass desired as waste pieces (cut-off list).

Using these three lists as a basis, the computer 88 displays to the operator on keyboard 90 and display 146 a menu of choices of lists. Keyboard 90 and display 146 may be of the type Model No. KB1012, manufactured by American Automatic Machines Corp. of Richmond, Calif. The operator chooses from the menu which list to alter. After selected deletions and/or additions to any of the particular lists, the operator signals computer 88 to "go" and the program appended hereto sorts the cut list and cut-off list such that pieces of glass having the largest areas are placed as the first elements of the lists. Also, preferably, the stock list is sorted such that pieces with the smallest areas thereupon are placed as the first elements of that list.

Figure 5:
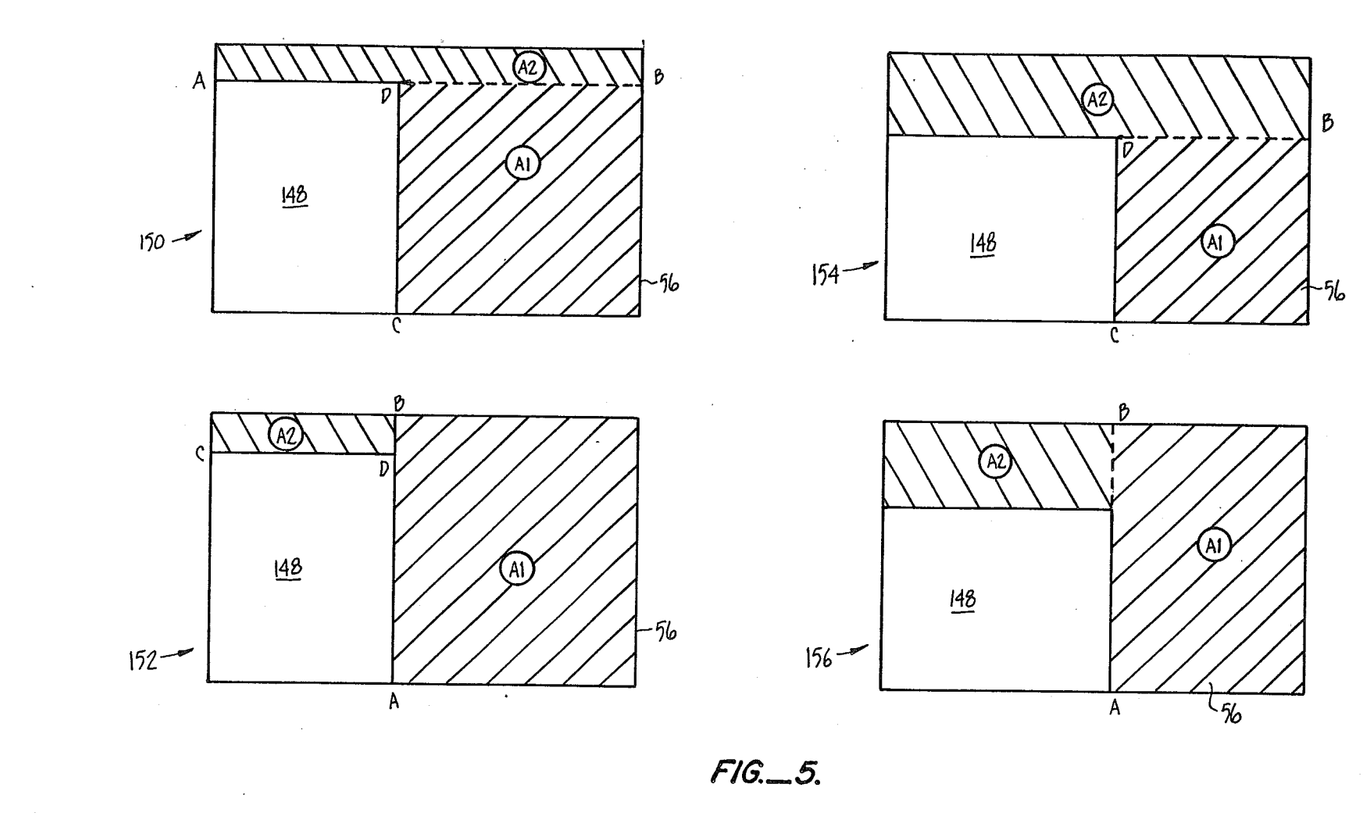
FIG. 5 is a schematic view showing a typical cutting procedure for a lite.

The program selectively sequences through the three lists. Starting with the smallest stock piece of glass and the largest desired cut piece of glass, i.e. lite, the dimensions are compared to determine if the desired piece can be cut from the stock piece. If the desired lite cannot fit, the next larger stock piece is compared. If the desired piece does fit on a stock piece of glass, the most optimum method of orientation in cutting the pattern is determined by calculating the areas of the pieces left after cutting. In the present invention, the optimum orientation and pattern would be based on that pattern and orientation that leaves the largest single area left over after a cutting operation. FIG. 5 shows four possibilities for cutting a lite 148 from a stock piece of glass 56, identified by reference characters 150, 152, 154 and 156. As shown in FIG. 5, possibility 152 would constitute the optimum cutting orientation since remainder piece A1 is larger than any remainder piece A1 in cutting sequences 150, 154 or 156.

The program next calculates the coordinates of the start and stop points of the cuts. Also, in this calculation, the sizes and coordinates of the pieces generated by the cuts are determined. Thus, a "pieces generated" list is carried by the program in addition to the initial lists which were fed into the computer.

The sequencing through the cut list and subsequent calculating of cuts takes into account the "pieces generated" list. Elements of that list are continually sorted such that the smallest sizes appear first thereupon. This greatly eliminates waste and cutting of the glass. Also, the repetitive comparison of pieces of glass on the cut list is also compared to the pieces generated list. The smallest generated piece will always be tried first by the program.

In effect, the sorting and sequencing may be further described as follows. The program attempts to fit the entire list of cut sizes onto the smallest size of stock that will hold them. If there are more pieces than will fit onto even the largest stock size, then the program trys to fit all the pieces from the cut list that will fit thereupon, skipping ones that won't fit, but trying every stock piece of glass.

When the cutting operation is determined by the program, a stock size to be initially loaded onto the table is shown by display 146. The computer is then started to control the cutting of the stock piece according to the determined sequence. Cutting wheel 38 actually cuts only a portion of glass piece 56, and such action may be better described as scoring. The computer also controls means 47 and 67 for raising and lowering the cutting wheel 38 and marking tip 66. Basically, when marking tip 66 is down on the surface of glass piece 56, the cutting wheel 38 is up and off the surface of glass piece 56, and vice versa. Oil dispensing means 76 releases oil when cutting wheel is in the down position only. Marking of the lites and desired waste pieces takes place, in the preferred embodiment, before any cuts are made on a blank stock piece of glass. The subject program determines the marking of each of these pieces of glass.

The cutting process described also results in the production of waste pieces of the particular sizes inputted to the computer ab initio. Thus, scrap pieces are trimmed down to uniform sizes to reduce the problems of storing a large number of sizes of waste pieces. The waste pieces may be inputted into the stock list after the cutting of each stock piece, if desired.

Stepping motors 96 and 120 are controlled by the program which calculates an internal list of starting and ending points for each cut. A linear interpolation is performed to calculate all the intermediate steps between the starting and ending points of a cut. For each intermediate point between the starting and ending point of a cut, an output signal is generated, sent to the translator 142, and from there sent to the motor to move the same.

To maximize the speed of the cuts in accordance with the power of stepping motors 96 and 120, the timing of the signals to the stepping motors is controlled such that the motors accelerate and decelerate between starting and ending points. This change in velocity is accomplished by varying the frequency with which the signals are sent to the stepping motors 96 and 120. To vary the frequency of the signal output, a series of timing delays are calculated, based on the distance from where the cutter is at the moment, to where the cutter is to go to complete the cut. The program continually monitors this "distance-to-go" distance and increases the delay (decelerates) or decreases the delay (accelerates), when the "distance-to-go" distance is less or more than the stopping distance for the cutter respectively.

As heretofore described, each cut piece and waste piece is labeled by marking means 58. This is accomplished when the program sequences through the cut list and extracts the four digit code which was inputted by the operator for each lite. From the coordinates and the code, the program generates the signals to move the cutting head 16 of device, and marking tip 66 to imprint as an indicia 60 such a four digit code. Of course, marking means 58 has been lowered to the surface of stock piece 56 while cutting wheel 38 has been raised therefrom by the use of means 67 and 57 hereinabove described.

The device 10 may be employed to cut out-of-square pieces of glass. When this occurs, one extra cut is programmed and accomplished to facilitate breaking out the desired piece of glass after the cut. Limitations such as cutting lites to a point or within one inch of the edge of the stock piece of glass have been programmed as limitations on the orientation of the particular cut and the cutting start and end points. Since the stepping motors 96 and 126 are extremely accurate in moving between steps, a very high degree of accuracy can be achieved in cutting glass with device 10.

While in the foregoing embodiments of the present invention have been set forth in considerable detail for the purpose of making a complete disclosure of the invention, it may be apparent to those of skill in the art that numerous changes may be made in such details without departing from the spirit and principles of the invention.

What is claimed is:

1. A method of operating a driven glass cutting head mounted on a glass cutting platform with the aid of a computer, comprising the steps of:
   a. providing the computer with a data base for the motor driven glass cutting head, including at least;
   a list of dimensions of desired pieces of glass
   a list of dimensions of pieces of glass in stock and
   a list of dimensions of desired waste pieces of glass;
   b. repetitively comparing in the computer the dimensions of one piece of glass of said list of desired pieces of glass with said dimensions of said list of pieces of glass in stock and determining the smallest one stock piece of glass therefrom which will fit said one desired piece of glass with at least one remainder piece of glass;
   c. determining in the computer the orientation of and cutting start and end points for the pattern of said one desired piece of glass in relation to said determined one stock piece of glass to produce a remainder piece of glass having a maximum area;
   d. adding in the computer the dimensions of said at least one remainder piece of glass to said list of dimensions of pieces of glass in stock to form a combined list of pieces of glass;
   e. repetitively comparing in the computer the dimensions at least another piece of glass of said list of desired pieces of glass to said combined list of pieces of glass and determining at least another smallest piece of glass therefrom which will fit said another desired piece of glass;
   f. determining in the computer the orientation of and the cutting start and end points for the pattern of said at least another desired piece of glass in relation to the determined at least another piece of glass from said combined list to produce at least another remainder piece of glass having a maximum area;
   g. repetitively comparing in the computer the dimensions of at least one desired waste piece of glass from said list of desired waste pieces of glass to at least a plurality of remainder pieces of glass and determining the smallest of said plurality of said remainder pieces of glass which will fit said at least one desired waste piece of glass;
   h. determining in the computer the orientation of and the cutting start and end points for the pattern of said at least one desired waste piece of glass on said determined remainder piece of glass;
   i. positioning said determining one stock of glass on the glass on the glass cutting platform;
   j. signalling from the computer to the cutting head said cutting start and end points for the pattern of said one desired piece of glass;
   k. cutting said one desired piece of glass from said determined one stock piece of glass according to said one desired piece signal;
   l. positioning said determined at least another piece of glass from said combined list on the cutting table;
   m. signalling from the computer to the cutting head said cutting start and end points for the pattern of said at least another desired piece of glass; and
   n. cutting said at least another desired piece of glass from said determined at least another piece of glass from said combined list according to said another desired piece signal;
   o. positioning said determined remainder piece of glass on the glass cutting platform;
   p. signalling from the computer to the cutting head said cutting start and end points for said desired waste piece; and
   q. cutting said desired waste piece of glass from said determined remainder piece of glass according to said desired waste piece signal.

2. The method of claim 1 in which said step of repetitively comparing in the computer the dimensions of one piece of glass of said list of desired pieces with said dimensions of said list of pieces of glass in stock further comprises repetitively comparing in the computer the dimensions of one desired piece of glass having the largest dimensions with said stock pieces of glass in the order or smallest to largest dimensions thereof.

3. The method of claim 2 in which said step of adding in the computer the dimensions of said at least one remainder piece of glass to said list of dimensions of pieces of glass in stock to form a combined list further comprises the step sorting said combined list in the order of increasing dimensions of said stock pieces of glass and said at least one remainder piece of glass.

4. The method of claim 1 which additionally comprises the step of marking a dimension of said one and another desired pieces of glass with marking means mounted on the motor driven glass cutting head.

5. The method of claim 1 which additionally comprises the step of marking a dimension of said desired waste piece of glass with marking means mounted on the motor driven glass cutting head.

6. A method of operating motor driven glass cutting head mounted on a glass cutting platform with the aid of a computer, comprising the steps of:
   a. placing a piece of glass on the platform;
   b. providing the computer with at least one dimension for a desired piece of glass to be cut from said piece of glass;
   c. producing a signal in the computer representing the cutting start and end points for obtaining said desired piece of glass based on said at least one dimension;
   d. transferring said cutting signal to the motor driven glass cutting head;
   e. cutting said piece of glass according to said transferred signal;
   f. providing marking means on the motor driven glass cutting head;
   g. producing a signal in the computer representing the marking start and end points for said at least one dimension for said desired piece of glass;
   h. transferring said marking signal to the motor driven glass cutting head with said marking means;
   i. marking the said surface of said desired piece of glass with said at least one dimension, said marking of said at least one dimension being positioned within the periphery of said desired piece of glass.

* * * * *